(12) United States Patent
Turek et al.

(10) Patent No.: US 6,460,070 B1
(45) Date of Patent: *Oct. 1, 2002

(54) MOBILE AGENTS FOR FAULT DIAGNOSIS AND CORRECTION IN A DISTRIBUTED COMPUTER ENVIRONMENT

(75) Inventors: John J. E. Turek, South Nyack, NY (US); Brian Jay Vetter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,962

(22) Filed: Jun. 3, 1998

(51) Int. Cl.7 ............................................. G06F 15/177
(52) U.S. Cl. ........................ 709/202; 709/223; 709/224; 714/25
(58) Field of Search ................................ 709/202, 223, 709/224, 239, 240, 206, 203; 370/241, 242; 714/4, 25, 46

(56) References Cited

U.S. PATENT DOCUMENTS

| | | | | |
|---|---|---|---|---|
| 5,113,398 A | | 5/1992 | Howes ...................... 371/11.2 |
| 5,157,667 A | | 10/1992 | Carusone, Jr. et al. ..... 371/29.1 |
| 5,321,813 A | | 6/1994 | McMillen et al. .......... 395/200 |
| 5,337,360 A | * | 8/1994 | Fischer ....................... 709/202 |
| 5,355,313 A | | 10/1994 | Moll et al. .................. 364/420 |
| 5,367,635 A | * | 11/1994 | Buaer et al. ................ 709/223 |
| 5,572,528 A | | 11/1996 | Shuen ..................... 370/85.13 |
| 5,596,712 A | | 1/1997 | Tsuyama et al. ....... 395/183.02 |
| 5,623,628 A | | 4/1997 | Brayton et al. ............. 395/468 |
| 5,655,081 A | * | 8/1997 | Bonnell et al. ............. 709/202 |
| 5,692,119 A | * | 11/1997 | Koguchi et al. ............... 714/4 |
| 5,706,422 A | * | 1/1998 | Maruyama et al. ............ 714/4 |
| 5,815,652 A | * | 9/1998 | Ote et al. .................... 709/224 |
| 5,838,918 A | * | 11/1998 | Prager et al. ............... 709/221 |
| 5,872,931 A | * | 2/1999 | Chivaluri .................... 709/223 |
| 5,887,171 A | * | 3/1999 | Tada et al. .................. 709/206 |
| 5,901,286 A | * | 5/1999 | Danknick et al. ........... 709/203 |
| 5,913,037 A | * | 6/1999 | Spofford et al. ............ 709/224 |
| 5,987,135 A | * | 11/1999 | Johnson et al. ............. 709/201 |
| 6,009,456 A | * | 12/1999 | Frew et al. .................. 709/202 |
| 6,012,152 A | * | 1/2000 | Douik et al. .................. 714/26 |
| 6,049,819 A | * | 4/2000 | Buckle et al. ............... 709/202 |
| 6,055,562 A | * | 4/2000 | Devarakonda et al. ...... 709/202 |
| 6,088,727 A | * | 7/2000 | Hosokawa et al. ......... 709/223 |

FOREIGN PATENT DOCUMENTS

| | | | |
|---|---|---|---|
| EP | 563684 | 3/1992 | ........... G05B/23/02 |
| JP | 2234521 | 3/1989 | ............ H04B/3/46 |

OTHER PUBLICATIONS

Adl–Tabatabai, Ali–Reza; "Efficient and Language–Independent Mobile Programs", May 1996, ACM SIGPLAN'96 Conference on Programming Language Design and Implementation.*

(List continued on next page.)

Primary Examiner—Mark H. Rinehart
Assistant Examiner—Marc D. Thompson
(74) Attorney, Agent, or Firm—Duke W. Yee; Jeffery S. LaBaw; Stephen R. Loe

(57) ABSTRACT

A large distributed enterprise includes computing resources that are organized into one or more managed regions, each region being managed by a management server servicing one or more gateway machines, with each gateway machine servicing a plurality of endpoint machines. A method of diagnosing a fault in such an environment begins by deploying a management infrastructure throughout the computer network, the management infrastructure including a runtime environment at each of the endpoint machines. In response to occurrence of the fault, a software agent is selected, the software agent being executable by the runtime environment at an endpoint machine. The selected software agent is then deployed into the computer network to diagnosis the fault. If the location of the fault is indeterminate, the software agent migrates to the location by gathering information about the fault as it traverses the network.

30 Claims, 5 Drawing Sheets

OTHER PUBLICATIONS

Tennenhouse, David, et al.; "Towards and Active Network Architecture"; Jan. 1996; ACM SIGCOMM, Computer Communication Review, pp. 5–18.*

Tennehouse, David et al.; "A Survey of Active Network Research", Jan. 1997; IEEE Communications.*

Rose et al.; RFC 1212, "Concise MIB Definitions"; SNMP Working Group, Mar. 1991.*

McCloghrie et al.; RFC 1213, "Management Information Base for Network Management of TCP/IP–based Internets; MIB II"; SNMP Working Group, Mar. 1991.*

IBM Technical Disclosure Bulletin, "Systems Network Architecture Distribution Services Agent In–Progress Queue Methods and Recovery," 2/95, vol. 38, No. 2 (pp. 465–472).

IBM Technical Disclosure Bulletin, "Error–Handling Mechanism for Automated Problem Determination Service Agents on IBM Local Area Network Server Network," 10/96, vol. 39, No. 10 (pp. 191–192).

IBM Technical Disclosure Bulletin, "Monitoring System for Reliability, Accesability, and Serviceability," 9/94, vol. 37, No. 9 (pp. 363–364).

IBM Technical Disclosure Bulletin, "Knowledge Base Structure for Fault Management," 7/94, vol. 37, No. 7 (pp. 521–526).

* cited by examiner

MOBILE AGENTS FOR FAULT DIAGNOSIS AND CORRECTION IN A DISTRIBUTED COMPUTER ENVIRONMENT

BACKGROUND OF THE INVENTION

1. Technical Field

The present invention is directed to managing a large distributed computer enterprise environment and, more particularly, to diagnosing and correcting network faults in such an environment using mobile software agents.

2. Description of the Related Art

Today, companies desire to place all of their computing resources on the company network. To this end, it is known to connect computers in a large, geographically-dispersed network environment and to manage such an environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. This amount of power, however, is quite costly. Each managed node requires upwards of a megabyte of local memory of disk plus a permanent TCP/IP connection. If a managed node sees heavy use, then such costs go up considerably. Moreover, as the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day. Nevertheless, the management routines on these machines are constantly poised, ready to handle dozens of simultaneous method invocations from dozens of widespread locations, invocations that rarely occur.

Moreover, the problem of keeping a distributed management framework connected is a continuous job. Any number of everyday actions can sever a connection or otherwise contribute to a fault condition. As a result, in large, distributed computer networks such as described above, network problems are complicated and difficult to diagnose. Although certain "clues" may be present that would lead a skilled technician or expert program to arrive at a list of probable causes for the failure, it is often quite difficult to determine where the fault originates. Moreover, even when the fault location and its cause are identified with certainty, it then becomes necessary for a system administrator to manually correct the fault or to dispatch others to the location for this purpose.

It would be a significant advantage to provide some automatic means of diagnosing and correcting network problems in this type of computer environment. The present invention addresses this important problem.

BRIEF SUMMARY OF THE INVENTION

It is a primary object of this invention to automatically diagnose faults or other events that occur in a large, distributed computer network.

It is another primary object of this invention to deploy a software "agent" into a distributed computer network environment to diagnose and, if possible, correct a fault.

It is yet another object of this invention to select a given software agent from a set of such agents based on a particular fault and to dispatch the selected agent into the network to locate and correct the fault.

Yet another object of this invention is to automate the diagnosis of network events in a large, distributed computing network.

A still further object of the invention is to dispatch, into a large distributed computer network, the minimum amount of code that may be necessary to rectify a given network fault.

Another object of this invention is to deploy a self-routing software agent into a distributed computer network to locate and correct a network fault or to address some other network event. Preferably, the software agent is a minimum set of tasks that are identified for use in diagnosing and/or correcting the fault.

Yet another object of the present invention is to collect information about network conditions as mobile software agents are dispatched and migrated throughout a large computer network to correct network faults, wherein such information is then useful in diagnosing new faults.

These and other object of the invention are provided in a method of diagnosing a given event (e.g., a fault, an alarm, or the like) in a large, distributed computer network in which a management infrastructure is supported. The management infrastructure includes a dispatch mechanism preferably located at a central location, and a runtime environment supported on given nodes of the network. In particular, the runtime environment (e.g., an engine) is preferably part of a distributed framework supported on each managed node of the distributed enterprise environment. The method begins upon a given event. In response, the dispatch mechanism selects a software "agent", preferably from a set of software agents useful in diagnosing network events. Alternatively, the dispatch mechanism creates the software agent by assembling a set of one or more tasks. The software agent selected or created is preferably a set of tasks that are selected or assembled based on the nature of the given event. Thus, the particular triggering "event" is used to provide clues as to the network location to which the agent should be sent, as well as the type of agent to send.

The software agent is then deployed into the computer network, for example, to determine a cause and location of the given event. When the software agent is received at a given node, the method determines whether the event originated from the node. If so, the software agent identifies the cause and, if possible, undertakes a corrective or other action depending on the nature of the event in question. Thus, for example, if the event were a fault, the software agent attempts to correct the fault. If, however, the event originated elsewhere, the software agent identifies a subset of nodes in the computer network that remain possible candidates for origination of the event. Preferably, the software agent then replicates itself to create a new instance. This new instance is then launched to the identified subset to continue searching for the location and cause of the event. At each node, this process is repeated until the location is identified.

At each node, the software agent is preferably run by the runtime engine previously deployed there. Alternatively, the software agent runs as a standalone process using existing local resources. As noted above, when the event is a fault, the software agent locates the fault and attempts to rectify it.

If necessary, the software agent may obtain additional code from the dispatch mechanism or some other network source. Such additional code may be another software agent.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
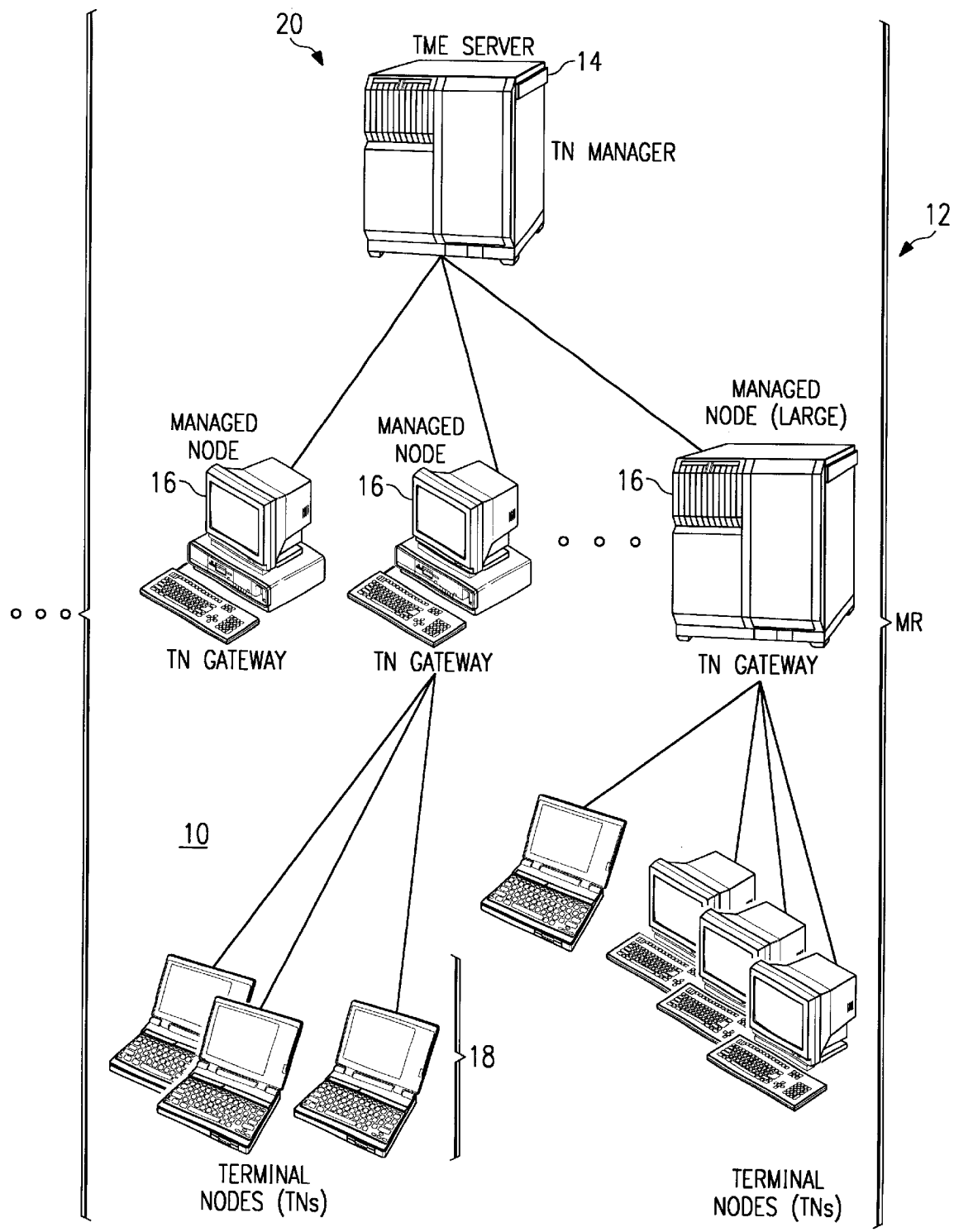
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
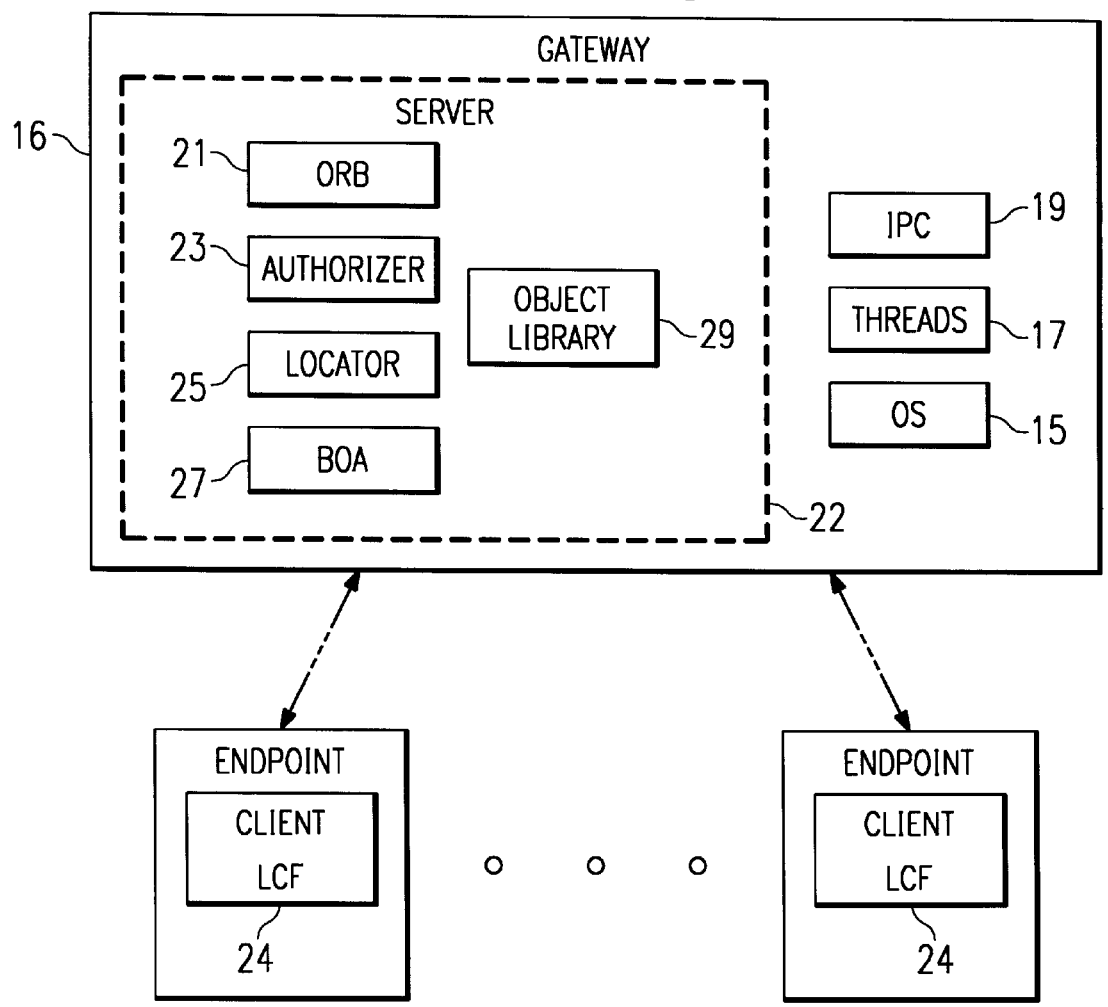
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machines 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
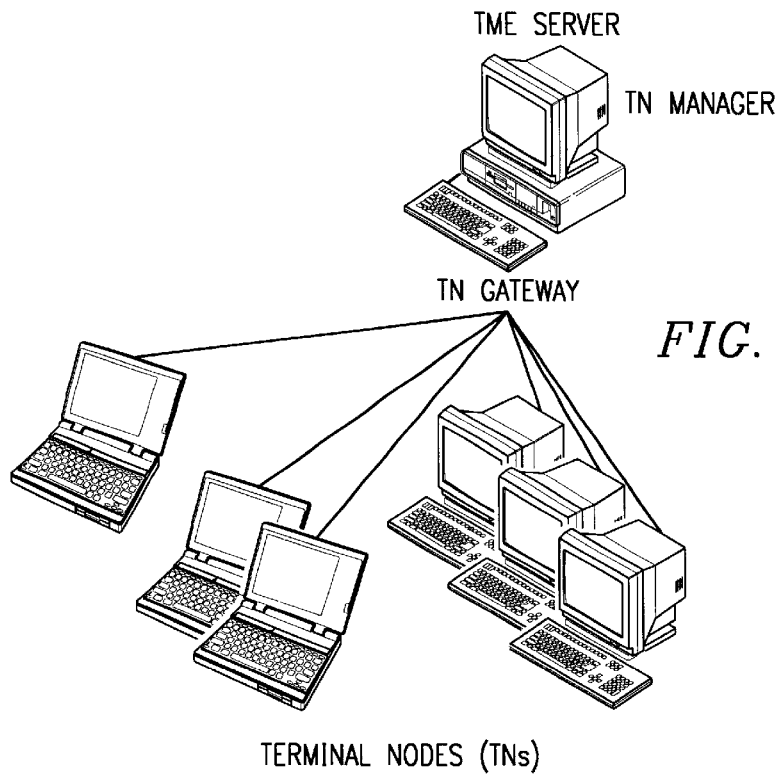
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint upcall requests, and (its main task) acting as a gateway for method invocations on endpoints.

Figure 2A:
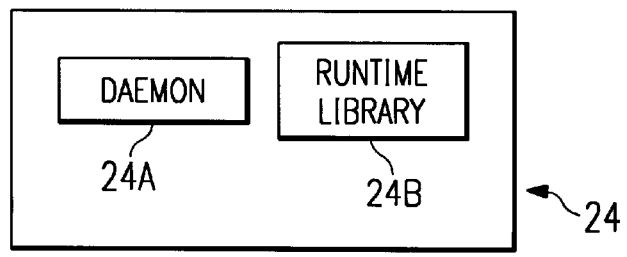
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the lcf daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000@ (a reduced instruction set or so-called RISC-based workstation) running the AIX (Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines. embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

A preferred embodiment of the present invention is implemented in the enterprise environment illustrated above. In this embodiment, a set of "software agents" are available at a central location (e.g., manager 14) or at a plurality of locations (e.g., the gateways 16) in the o network where network errors are reported. The software agents are "mobile" in the sense that the agents are dispatched (as will be described below) from a dispatch mechanism and then migrate throughout the network environment. Generally, the mobile software agents traverse the network to diagnose and, if possible, to correct a network fault.

Thus, when a network error or "fault" is reported whose cause and location are not apparent or readily ascertainable, an appropriate agent is identified and dispatched to determine this information. Preferably, the agent is dispatched to the actual node in the network at which the fault condition occurs. As will be seen, the particular error, as well as other associated events, generally provide a "clue" or clues regarding the network location to which the agent should be sent, as well as the type of agent to send. If the agent does not find the fault at the initial location to be examined, the agent then migrates through the network to locate the error. The agent preferably chooses its path through the network based on the information received at the dispatching location, as well as information gleaned from each examined location. As will be seen, the particular "path" typically varies as the software agent migrates through the network because information gleaned from a particular node may redirect the agent in some given manner.

Figure 4:
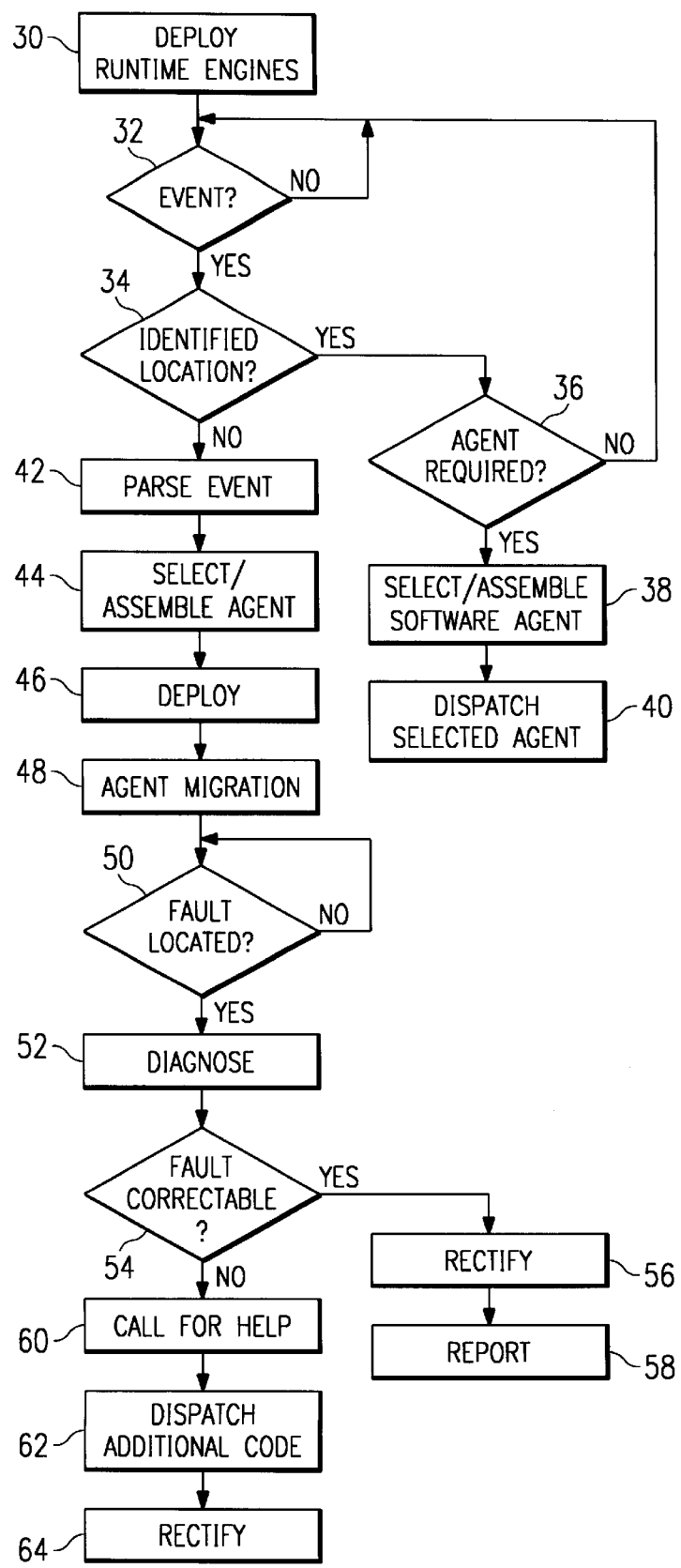
FIG. 4 is a flowchart illustrating a preferred method of dispatching a software agent in response to a fault in the computer network of FIG. 5.
Figure 5:
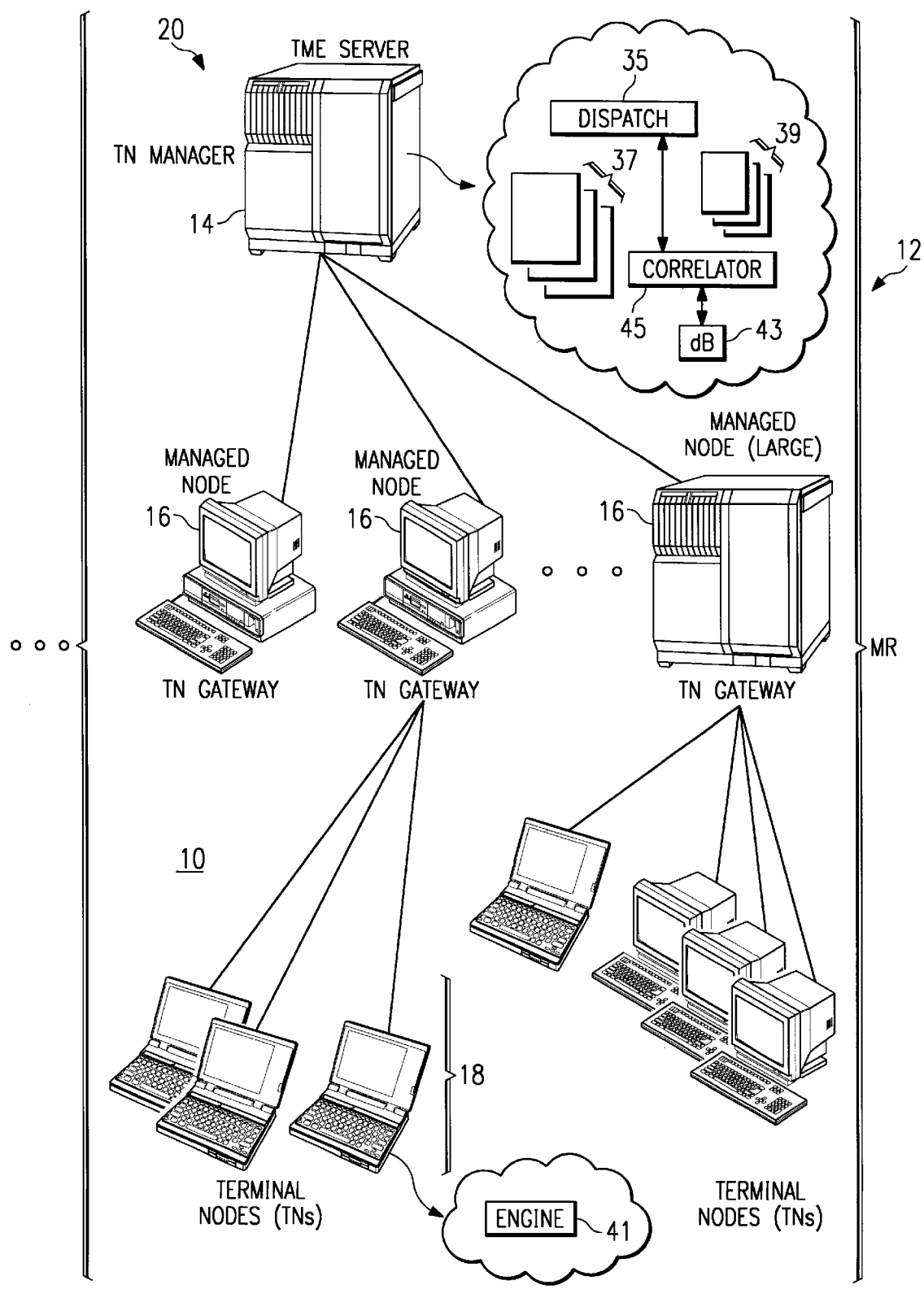
FIG. 5 is a distributed computer network environment having a management infrastructure for use in carrying out the preferred method of the present invention.

A flowchart illustrating a preferred operation of the invention is shown in FIG. 4. For illustrative purposes, the method is implemented in the large, distributed enterprise environment shown in FIG. 5, although this is not a limitation of the invention. In this example, the manager 14 includes the dispatch mechanism 35 having a set of software agents 37 associated therewith. Alternatively, dispatch mechanism 35 may include a set of configurable software tasks 39 from which one or more agents are constructed. Manager 14 preferably also includes a database 43 and an event correlator 45, for the purposes described below. The dispatch mechanism itself may be distributed across multiple nodes. Each of the gateway nodes 16 and each of the terminal nodes 18 (or some defined subset thereof) include a runtime engine 41 that has been downloaded to the particular node via a distribution service. The engine 41 provides a runtime environment for the software agent. Although not meant to be limiting, the particular distribution technique may involve a subscription process such as described in U.S Pat. No. 08/414,960, titled "Method For Managing Distributed Computer Network Configuration Information" and assigned to the assignee of the present invention. Alternatively, the diagnostic engines may be distributed to the various nodes via the technique described in U.S. Ser. No. 08/089,964, titled "Drag And Drop Technique For Distributing Visual Builder Built Tasks In A Computer Network", which is also assigned to the assignee of this invention. Those disclosures are incorporated herein by reference.

The runtime engine 41 may also comprise generic diagnostic functionality that may be useful in diagnosing and rectifying errors that arise in the computer network. Preferably, it is expected that the runtime engine interacts with a software agent for this purpose. In a preferred embodiment, the present invention envisions automatic deployment of one or more software agents to locate a particular network fault, and the use of such agent (once the fault is located) to rectify the problem. Preferably, the software agent is a piece of code executed by the runtime engine located at the node at which the agent locates the problem. Alternatively, the software agent runs as a standalone application using local resources. Yet another alternative is to have the software agent control a diagnostic engine which, in turn, diagnoses and then rectifies the fault.

In a representative embodiment, both the runtime engine and the software agent(s) are conveniently written in Java. As is known in the art, Java is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser.

In one particular embodiment of the present invention, a software agent is a Java applet (e.g., comprised of a set of Java "class" files) and the runtime environment includes a Java Virtual Machine (JVM) associated with a Web browser. In this illustrative example, various nodes of the network are part of the Internet, an intranet, or some other computer network or portion thereof. When the given fault occurs, the dispatch mechanism compiles the appropriate Java class files (based on the event) and dispatches the applet (as the software agent) across the network to the target node. The applet is executed on the JVM located at the target node.

Turning now to FIG. 4, a preferred dispatch routine begins at step 30 with the distribution of the runtime engines to the various nodes. In this embodiment, the runtime engine comprises part of the LCF runtime library 24B, as has been previously described. These engines collectively form a part of a management infrastructure of the enterprise environment. Once the management infrastructure is in place, the actual operating routine begins. At step 32, a test is performed at the dispatch mechanism 15 to determine whether a given event has occurred. As noted above, for illustrative purposes, a given event is a network "fault", alarm or other such trigger. One of ordinary skill will appreciate that the particular event need not be a fault or alarm type of condition, however. An alternative event might be a request for maintenance in some non-specific area of the network. The software agent might then be deployed to the general area from which the request originated but then used to identify a specific target location at which the request will be serviced. The dispatch mechanism preferably includes an appropriate user interface to enable an administrator to identify event (s). Alternatively, event consumers may subscribe to the dispatch mechanism by identifying particular events of which they are interested in receiving notice.

If the outcome of the test at step 32 is negative, the routine cycles as shown. If, however, the outcome of the test at step 32 indicates that a fault has-occurred, the method continues at step 34 to test whether the location of the fault can be identified. If not, the routine continues as will be described. If, however, the outcome of the test at step 34 indicates that the location of the fault is known, the method branches to step 36 to determine whether a mobile software agent is required. If the outcome of the test at step 36 is positive, a software agent is selected (or assembled, as required) at step 38 and then dispatched to the location at step 40. If, however, the outcome of the test at step 36 is negative, which indicates that a mobile agent is not required, the routine returns to step 32 and waits for the next event.

If the outcome of the test at step 34 indicates that the location of the fault is unknown, the main processing loop begins. In particular, at step 42, the event is parsed to determine whether it provides any clue as to where the fault originates. The dispatch mechanism preferably maintains a database (reference numeral 43 in FIG. 5) of information derived from prior events that is useful in determining how a particular event may be diagnosed and corrected. Dispatch mechanism also preferably includes the event "correlator" (or rule base) (reference numeral 45 in FIG. 5) that uses the information in the database to help determine the nature and potential location of the event. As an example, a particular "event" may comprise a plurality of alarms generated by a number of resources in a particular area of the network. By parsing such information through the event correlator/database, the dispatch mechanism may make a decision about the cause of the event. In this sense, the information received by the dispatch mechanism provides a clue regarding how the new event should be addressed.

At step 44, the dispatch mechanism selects an appropriate software agent based on the event and/or information retrieved from the database and the event correlator. As used herein, the selection process of step 44 may involve compiling one or more software tasks into a "custom" software agent for this purpose. Thus, the present invention covers the use of an existing software agent, as well as an agent that is created or generated "on-the-fly" as a result of a given network event that requires diagnosis and/or correction.

The method continues at step 46 with the software agent being deployed into the network. At step 48, the software agent migrates though the network. A test is then done at step 50 to determine whether the software agent has located the fault. If the outcome of the test at step 50 is negative, the routine cycles. If, however, the outcome of the test at step 50 indicates that the software agent has arrived at the fault location, the routine continues at step 52. At this step, software agent (either alone, or together with some functionality provided by the runtime engine already resident on the node) diagnoses the fault. At step 54, a test is done to determine whether the software agent (either alone, or together with some functionality provided by the runtime engine) can correct the problem. If the outcome of the test at step 54 is positive, the routine continues at step 56 and the problem is rectified. At step 58, information about the problem and the corrective action that as undertaken are reported back to the dispatch mechanism and stored in the database for future use.

If, however, the outcome of the test at step 54 indicates that the software engine and/or the runtime engine cannot rectify the problem, a call is made at step 60 to obtain additional help. In a preferred embodiment, dispatch mechanism 62 responds to the call and dispatches additional code (e.g., another software engine) to the node to assist in the problem diagnosis and/or correction, as the case may be. At step 64, the fault is rectified. This completes the processing.

Figure 6:
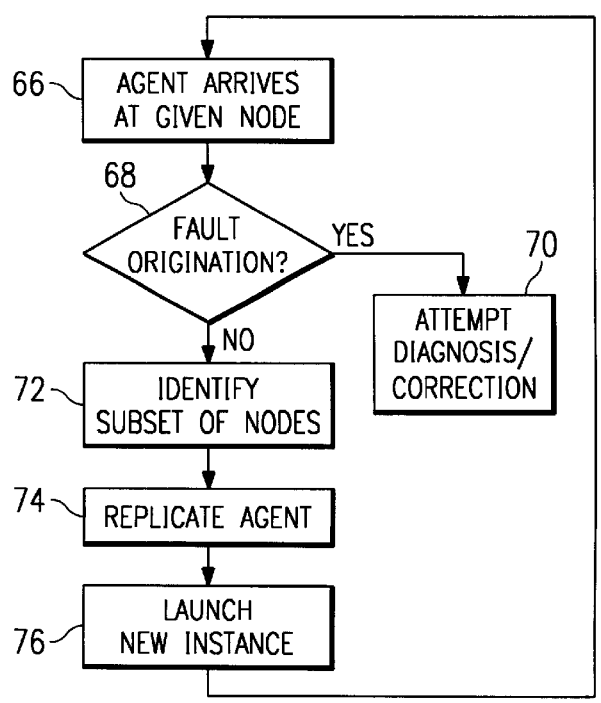
FIG. 6 is a flowchart of a software agent migration mechanism according to the preferred embodiment of this invention.

Turning now to FIG. 6, a preferred method is illustrated for migrating the software agent to the desired location of the given network event. Generally, migration is effected by targeting the software agent to a given node of the network and then having the agent find its way to the actual fault through a recursive migration process. This process begins at step 66 when the software agent arrives at a given node. At step 68, a test is performed to determine whether the fault originated from the given node. If so, the routine continues at step 70 to attempt diagnosis and/or fault correction, as has been previously described. If, however, the fault did not originate at the node (as indicated by a negative outcome of the test at step 70), the routine continues at step 72 by identifying a subset of nodes (associated with the given node) that remain candidates for locating the error.

The decision as to which subset of nodes remain viable candidates may depend on a number of factors including, without limitation, the nature and type of fault, information obtained by the software agent during the test at step 70, and the like.

At step 74, the software agent is preferably replicated by the runtime engine. Alternatively, the software engine may be passed onward without replication. Then, at step 76, the new instance of the software agent (or the agent itself, as the case may be) is launched toward the subset of nodes identified in step 72. At the same time, information collected by the software agent and/or the runtime engine is returned to the dispatch mechanism and stored in the database for future use. In this way, even though the given node was not the source of the fault, the information obtained during the test at step 70 may be added to the database to enhance system operation in the future. When the software agent reaches a given node of the subset, the routine cycles until the outcome of the test at step 68 is positive.

Thus, in the preferred embodiment, the particular software agent is deployed into the network environment by the dispatch mechanism. The dispatch mechanism is usually supported by the system manager 14, although it may also be located at a particular gateway node 16 or it may exist as a standalone machine. The initial "target" of the software agent may be some general location within the network. In a preferred operation, the software agent, in effect, "homes-in" on the fault location using the recursive technique described in the flowchart of FIG. 6. Once the actual fault is located, the runtime engine executes the software agent to diagnose and/or rectify the problem, or it requests additional help for this purpose if necessary.

As has been previously noted, the particular error and events associated therewith are useful in selecting the type of agent best suited for the diagnostic procedure. This is sometimes referred to herein as "event driven" agent dispatch, because the particular software tasks that comprise the agent are determined by some characteristic of the event. By the event driven dispatch, a minimum amount of code, i.e. preferably the smallest needed agent, is sent through the network. This conserves network bandwidth as software agents migrate through the network. In some cases, two or more agents, or an agent created by the dispatch mechanism from two diagnostic procedures, may be used if indicated.

In one preferred embodiment, the agent is an object composed of a set of tasks routable to appropriate systems in the large, distributed computer network. The set of tasks may be coupled together as may be necessary to diagnose and/or correct the fault. At each node, the agent is preferably incorporated into or otherwise executed by the previously-deployed runtime environment. Thus, as a large portion (namely, the runtime engine) of the diagnostic capability is already at the system to be diagnosed, network traffic is further minimized.

Once the fault or other problem has been diagnosed, the agent attempts to fix the problem The agent may have the necessary code or it may send requests to the dispatch mechanism for additional code to effect the repair. The to dispatch mechanism may be located in distributed locations as well, if desired. The additional code may be other software agent(s). If unable to effect repairs, the agent will, at a minimum, report back with the diagnosis to a user interface of the dispatch mechanism .

A by-product of this invention is that an enterprise can place substantially all of its computing resources on a network that is managed in a reliable, cost-effective manner. Low-level computing resources, such as end-of-wire or "endpoint" machines, preferably support an engine that, together with a mobile software agent, diagnose and, if possible, rectify a network problem. The software agent is preferably a smallest amount of software code that is necessary to address the problem. By distributing some of the diagnostic functionality in the engine, network bandwidth is conserved because only a small amount of code needs to be dispatched to the target site. This reduces complexity and cost of systems management in the large enterprise environment.

The present invention meets the needs of customers with very large and geographically-dispersed networks and, more particularly, to significantly expand the automatic diagnostic capabilities of the network. By enabling automatic fault diagnosis and correction, the number of system administrators and technicians may be conveniently reduced.

In the preferred embodiment, these and other objects are achieved in a large distributed enterprise that includes computing resources organized into one or more managed regions, each region being managed by a management server servicing one or more gateway machines, with each gateway machine servicing a plurality of endpoint machines. A system management framework is preferably "distributed" on the gateway machines and the one or more endpoint machines to carry out system management tasks. Although the above environment is preferred, one of ordinary skill will appreciate that the inventive concepts may be implemented in smaller distributed client server network environments. Thus, the invention should not be construed to be limited to a particular large scale, distributed computing environment as described in the preferred embodiment.

According to a feature of the invention, an endpoint computer connectable into such an enterprise includes a processor, an operating system, a graphical user interface, optionally a browser, and a runtime environment. The runtime environment is preferably distributed to the endpoint computer in a prior distribution process when the enterprise configuration is initialized or otherwise reconfigured. The particular method by which the engine "piece" is distributed to the endpoint computer is not part of the present invention.

The client-class framework running on each endpoint is preferably a low-maintenance, low-cost framework that is ready to do management tasks but consumes few machine resources (because it is normally in an idle state). Each endpoint preferably is "dataless" in the sense that system management data is not stored therein before or after a particular system management task is implemented or carried out. This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described our invention, what we claim as new and desire to secure by letters patent is set forth in the following claims:

What is claimed is:

1. A method of diagnosing a fault in a large, distributed computer network having a management server servicing a set of gateway machines, each of the gateway machines servicing a set of endpoint machines, the method comprising the steps of:

deploying a management infrastructure throughout the computer network, the management infrastructure including a runtime environment at each of the endpoint machines;

in response to occurrence of the fault, selecting a software agent, the software agent being executable by the runtime environment at an endpoint machine; and deploying the selected software agent into the computer network to diagnose the fault.

2. The method as described in claim 1 further including the step of having the software agent attempt to correct the fault.

3. The method as described in claim 2 wherein the step of having the software agent attempt to correct the fault includes utilizing code of the software agent to fix the fault.

4. The method as described in claim 2 wherein the step of having the software agent attempt to correct the fault includes requesting additional code to be dispatched from another node in the network.

5. The method as described in claim 4 wherein the additional code is another software agent.

6. The method as described in claim 1 wherein the selecting step includes identifying a given characteristic of the fault and selecting the software agent based on the given characteristic.

7. The method as described in claim 6 wherein the step of selecting the software agent further includes assembling a set of tasks necessary to diagnosis the fault.

8. The method as described in claim 1 wherein the runtime environment comprises a runtime engine and the software agent is a set of one or more tasks executable by the runtime engine.

9. The method as described in claim 8 wherein the computer network includes the Internet, the runtime engine is associated with a Web browser and the software agent is an applet.

10. The method as described in claim 12 wherein the fault is diagnosed and corrected using code in the software agent.

11. A method of diagnosing a fault in a large, distributed computer network having a management server servicing a set of gateway machines, each of the gateway machines servicing a set of endpoint machines, the method comprising the steps of:
- deploying a management infrastructure throughout the computer network, the management infrastructure including a runtime environment at each of the endpoint machines;
- in response to occurrence of the fault, selecting a software agent, the software agent being executable by the runtime environment at an endpoint machine; and
- deploying the selected software agent into the computer network to diagnosis the fault;
- wherein the step of deploying the selected software agent comprises the steps of:
  - migrating the selected software agent across a given set of nodes in the computer network;
  - at each node at which the selected software agent is received:
    - (a) determining whether the fault originated from the node;
    - (b) if the fault did not originate from the node, identifying a given subset of nodes associated with the node that remain candidates for locating the fault;
    - (c) deploying the software agent to the given subset; and
    - (d) repeating steps (a)–(c) until a location of the fault is determined.

12. A method of diagnosing and correcting a fault in a large, distributed computer network in which a management infrastructure is supported, comprising the steps of:
- in response to occurrence of the fault, selecting at least one software agent from a set of software agents useful in diagnosing network events;
- migrating the selected software agent across a given set of nodes in the computer network until the software agent arrives at the location of the fault; and
- diagnosing and correcting the fault.

13. The method as described in claim 12 wherein the management infrastructure includes a runtime environment deployed at each node of the computer network and the software agent is a set of one or more tasks executed by the runtime environment.

14. The method as described in claim 13 wherein the computer network includes the Internet, the runtime environment is associated with a Web browser and the software agent is an applet.

15. The method as described in claim 12 wherein the fault is corrected by dispatching additional code to the location.

16. The method as described in claim 15 wherein the additional code is another software agent.

17. A method of diagnosing and correcting a fault in a large, distributed computer network in which a management infrastructure is supported, comprising the steps of:
- in response to occurrence of the fault, selecting at least one software agent from a set of software agents useful in diagnosing network events;
- migrating the selected software agent across a given set of nodes in the computer network until the software agent arrives at the location of the fault; and
- diagnosing and correcting the fault;
- wherein the selecting step includes identifying a given characteristic of the fault and selecting the software agent based on the given characteristic.

18. The method as described in claim 17 wherein the selecting step includes assembling a set of tasks necessary to diagnose the fault.

19. In a large distributed enterprise having a management server servicing a set of gateway machines, each of which services a set of endpoint machines, a diagnostic method comprising the steps of:
- deploying a management infrastructure throughout the computer network, the management infrastructure including a runtime environment at given endpoint machines;
- in response to occurrence of a given event, selecting a software agent, the software agent being executable by the runtime environment at an endpoint machine;
- deploying the selected software agent into the computer network to diagnosis the event.

20. The diagnostic method as described in claim 19 wherein the event is a fault.

21. In a large distributed enterprise having a management server servicing a set of gateway machines, each of which services a set of endpoint machines, a diagnostic method comprising the steps of:
- deploying a management infrastructure throughout the computer network, the management infrastructure including a runtime environment at given endpoint machines;
- in response to occurrence of a given event selecting a software agent, the software agent being executable by the runtime environment at an endpoint machine;
- deploying the selected software agent into the computer network to diagnosis the event;
- wherein the software agent is deployed by:
  - migrating the selected software agent across a given set of nodes in the computer network; and
  - at each node at which the selected software agent is received:

(a) determining whether the fault originated from the node;

(b) if the fault did not originate from the node, identifying a given subset of nodes associated with the node that remain candidates for locating the fault;

(c) deploying the software agent to the given subset; and (d) repeating steps (a)–(c) until a location of the fault is identified.

22. Apparatus connectable into a large distributed enterprise having a management server servicing a set of gateway machines, each of which services a set of endpoint machines, comprising:

means for deploying a management infrastructure throughout the computer network, the management infrastructure including a runtime environment for use at each of the endpoint machines;

means, responsive to occurrence of a given event, for selecting a software agent to diagnose the event, the software agent being executable by the runtime environment at an endpoint machine; and means for deploying the selected software agent into the computer network to diagnosis the event.

23. The apparatus as described in claim 22 wherein the given event is a fault and the software agent is deployed to diagnose and correct the fault.

24. Apparatus connectable into a large distributed enterprise having a management server servicing a set of gateway machines, each of which services a set of endpoint machines, comprising:

means for deploying a management infrastructure throughout the computer network, the management infrastructure including a runtime environment for use at each of the endpoint machines;

means, responsive to occurrence of a given event, for selecting a software agent to diagnose the event, the software agent being executable by the runtime environment at an endpoint machine; and means for deploying the computer network to diagnosis the event;

wherein the selecting means includes:

means for parsing information about the event to identify one or more characteristics of the event; and means responsive to the parsing means for correlating the one or more event characteristics with information about prior events to identify the software agent.

25. A computer program product in computer-readable media for use in a computer having a processor, a memory, and means for connecting the computer into a large distributed enterprise having a management server servicing a set of gateway machines, the computer connectable to one of the gateway machines, the computer program product comprising:

a runtime environment downloaded to the computer during a deployment operation; and a software agent deployed to the computer during a diagnostic operation and being executable by the runtime environment to diagnose a given condition associated with the computer.

26. The computer program product as described in claim 25 wherein the software agent includes one or more tasks selected in response to the given condition.

27. A computer program product in computer-readable media for use in a computer having a processor, a memory, and means for connecting the computer into a large distributed enterprise having a management server servicing a set of gateway machines, the computer connectable to one of the gateway machines, the computer program product comprising:

a runtime environment downloaded to the computer during a deployment operation; and a software agent deployed to the computer during a diagnostic operation and being executable by the runtime environment to diagnose a given condition associated with the computer;

wherein the runtime environment is associated with a browser of the computer and the software agent is a Java applet.

28. A computer program product in computer-readable media for use in a computer having a processor, a memory, and means for connecting the computer into a large distributed computer network, the computer network having a management server servicing a set of gateway machines, each of which services a set of endpoint machines, the computer program product comprising:

means for deploying a management infrastructure throughout the computer network, the management infrastructure including a runtime environment for use at each of the endpoint machines;

a set of software agents, each of the software agents comprising a set of one or more tasks;

means, responsive to occurrence of a given event, for selecting a software agent to diagnose the event, the software agent being executable by the runtime environment at an endpoint machine; and means for deploying the selected software agent into the computer network to diagnosis the event.

29. The computer program product as described in claim 28 wherein the given event is a fault and the software agent is deployed to diagnose and correct the fault.

30. A computer program product in computer-readable media for use in a computer having a processor, a memory, and means for connecting the computer into a large distributed computer network, the computer network having a management server servicing a set of gateway machines, each of which services a set of endpoint machines, the computer program product comprising:

means for deploying a management infrastructure throughout the computer network, the management infrastructure including a runtime environment for use at each of the endpoint machines;

a set of software agents, each of the software agents comprising a set of one or more tasks;

means, responsive to occurrence of a given event, for selecting a software agent to diagnose the event, the software agent being executable by the runtime environment at an endpoint machine, and means for deploying the selected software agent into the computer network to diagnosis the event;

wherein the selecting means includes:

means for parsing information about the event to identify one or more characteristics of the event; and means responsive to the parsing means for correlating the one or more event characteristics with information about prior events to identify the software agent.

* * * * *

UNITED STATES PATENT AND TRADEMARK OFFICE
CERTIFICATE OF CORRECTION

PATENT NO.     : 6,460,070 B1
DATED          : October 1, 2002
INVENTOR(S)    : Turek et al.

It is certified that error appears in the above-identified patent and that said Letters Patent is hereby corrected as shown below:

<u>Column 5,</u>
Line 18, after "server machines.", please begin a new paragraph and insert
-- Each endpoint is also a computer. In one preferred --.

Signed and Sealed this

Thirteenth Day of May, 2003

JAMES E. ROGAN
*Director of the United States Patent and Trademark Office*